United States Patent [19]

Brown et al.

[11] 4,348,366

[45] Sep. 7, 1982

[54] PROCESS FOR THE PRODUCTION OF ALUMINA AND ALUMINA COMPOUNDS FROM WASTES

[76] Inventors: Raymond J. Brown, 2235 Hackamore Ct., Walnut Creek, Calif. 94596; Ronald L. Keller, 1003 N. Main St., Bicknell, Ind. 47512; Charles F. Lang, 3528 Hillcrest Rd., Vincennes, Ind. 47591

[21] Appl. No.: 251,345

[22] Filed: Apr. 6, 1981

[51] Int. Cl.$^3$ ............................................. C01F 7/02
[52] U.S. Cl. ................................ 423/111; 423/115; 423/131; 423/627
[58] Field of Search ............... 423/111, 131, 627, 115

[56] References Cited

U.S. PATENT DOCUMENTS

| | | | |
|---|---|---|---|
| 2,867,505 | 1/1959 | Block | 23/143 |
| 2,871,095 | 1/1959 | Hervert et al. | 23/143 |
| 2,989,372 | 6/1961 | Gilbert | 23/143 |
| 3,185,545 | 5/1965 | Scott | 23/141 |
| 3,358,937 | 12/1967 | Pearson et al. | 241/15 |
| 3,432,313 | 3/1969 | Gitzen et al. | 106/46 |
| 3,488,147 | 1/1970 | Keith et al. | 23/143 |
| 3,516,840 | 6/1970 | Gitzen et al. | 106/65 |
| 3,660,076 | 5/1972 | Williams | 75/68 R |
| 4,080,431 | 3/1978 | Moss | 423/289 |
| 4,113,832 | 9/1978 | Bell et al. | 423/111 |
| 4,252,776 | 2/1981 | Huckabay et al. | 423/111 |

*Primary Examiner*—Herbert T. Carter
*Attorney, Agent, or Firm*—Veronica C. Devitt

[57] ABSTRACT

A process for the recovery of substantially all of the aluminum from aluminum bearing waste products which includes a method for the commercial production of alumina and compounds of alumina.

24 Claims, No Drawings

PROCESS FOR THE PRODUCTION OF ALUMINA AND ALUMINA COMPOUNDS FROM WASTES

BACKGROUND OF THE INVENTION

This invention relates to a commercial process for the production of alumina and other compounds having a high alumina content from aluminum bearing waste products.

"Alumina," as used herein, refers to a broad range of hydrous and anhydrous aluminum oxides.

It is well known that the processing of aluminum (such as the reduction of alumina to aluminum metal or the melting and/or alloying of aluminum) generates a tremendous amount of waste products. Almost all of these wastes contain varying amounts of aluminum as aluminum compounds, alumina and aluminum alloys. The percentage of impurities in any particular waste product depends on the purity of the starting material. For example, the waste products generated from the reduction of alumina into what is known as pure, prime or primary aluminum metal are relatively free of other metals or oxides of those metals. Conversely, waste products generated from any alloyed aluminum source contain higher and varying quantities of other metals and oxides of those metals. For example, magnesium oxide, calcium oxide and silica are the most common major impurities.

In the past commercial alumina products have been produced primarily from bauxite, mined and converted first to sodium aluminate by the well known Bayer process and then to alumina trihydrate. Because of the purity of the starting materials, this is the most direct process for the production of alumina. Until very recently, other processes which begin with aluminum containing waste products were not economically feasible.

Today, rising energy costs and dwindling natural resources have created a demand for utilization of aluminum containing waste products of the aluminum processing industry. This demand is additionally enhanced by the desire to reduce waste stockpiling and disposal problems.

A previous attempt to recover useful aluminum products from the treatment of aluminum furnace skim, a waste generated in primary aluminum processing, involved crushing the skim and subjecting it to a high temperature steam hydration in a pressurized system. The resulting particles were aluminum metal and other aluminum compounds which were free of nitrides and carbides. See Williams, U.S. Pat. No. 3,660,076.

It is the primary object of this invention to recover substantially all of the aluminum as alumina or high temperature alumina compounds from a chemically and physically heterogeneous aluminum bearing waste product, particularly from secondary aluminum recovery operations.

It is another object of this invention to produce from aluminum bearing wastes commercial alumina for a wide variety of applications other than aluminum metal production.

It is another object of this invention to produce from aluminum bearing wastes a variety of compounds having a high alumina content. For example, such compounds may include: magnesium aluminum oxide; various forms of magnesium aluminate; and magnesium aluminum silicate.

It is another object of this invention to produce alumina and alumina compounds by a low temperature, non-pressurized process.

It is a final object of this invention to convert the aluminum from bag house dust and related waste generated in aluminum dross processing into a variety of commercial products.

The accomplishment of each of these objectives is detailed herein.

SUMMARY OF THE INVENTION

This invention is a process for the production of alumina and compounds of alumina from aluminum bearing waste products comprising the following steps: pulverizing the waste; placing the pulverized waste in water to form a slurry; continuously agitating the slurry for a sufficient time, thereby substantially (1) dissociating the carbides, nitrides, and related aluminum compounds, (2) hydrolyzing the aluminum resulting from the previous step, and (3) oxidizing any remaining aluminum; diluting the product from the above steps; filtering and drying to recover an alumina product.

The process is based on a known series of chemical reactions. The make-up of the starting material and the desired end products necessitate certain variations on and additional steps to the basic process. This basic process, together with other modifications, is ideally suited to the recovery of substantially all of the aluminum, present in waste generated by secondary aluminum recovery operations, as alumina or high temperature alumina compounds.

Although the following discussion and examples use bag house dust as the aluminum bearing secondary waste material, it should be understood that the process is equally applicable to other secondary wastes, such as salty drosses known as salt cake, open hearth dross, etc.

DETAILED DESCRIPTION OF THE INVENTION

Bag house dust from commercial dross processing is a highly heterogeneous material. Its physical, chemical and mineralogical characteristics vary widely, not only daily, but also at times hourly. Its composition is extremely difficult to analyze.

Quantitative x-ray diffraction analysis of fifteen large samples of bag house dust taken from the same facility over an approximately four month period revealed a wide variation in the percentage of compounds making up the composition. The results of this analysis are illustrated in Table 1.

It should be noted that the actual percentage of any one compound present could exceed the range which is based on detectable compounds. This is because part of the compounds are in the amorphous phase and undetectable by x-ray diffraction due to poor crystallinity and/or ultra-fine particle size.

Other compounds, such as aluminum carbide, which exist only as part of an amorphous mass are not identifiable by x-ray diffraction.

TABLE 1

| Bag House Dust Composition[1] | |
|---|---|
| Compound | Approximate % Ranges |
| Aluminum nitride | 11.5–32.0 |
| Sodium and potassium chloride | 1.5–18.3 |
| Calcium carbonate | 0.4–4.4 |
| Aluminum oxide | 5.0–15.0 |
| Magnesium aluminum oxide | 6.0–27.0 |
| Magnesium oxide | 0.5–4.6 |

TABLE 1-continued

| Bag House Dust Composition[1] | |
|---|---|
| Compound | Approximate % Ranges |
| Silicon dioxide | 0.5–5.0 |
| Aluminum Metal | 3.0–14.0 |
| Amorphous Phase | 24.0–49.0 |

[1]Ranges based on x-ray diffraction of fifteen samples of bag house dust.

The physical characteristics of bag house dust are equally diverse. On the same samples as used in Table 1, the powder bulk densities ranged from 0.80 to 1.31 grams/cubic centimeter (g/cc), averaging 1.07 g/cc. The particle size distributions are listed in Table 2.

TABLE 2

| Particle Sizes in Bag House Dust Composition | | |
|---|---|---|
| Particle Mesh Size | Approximate % Range | Average % |
| +80 | 2–9 | 5 |
| +120 | 6–16 | 9 |
| +200 | 16–26 | 20 |
| −200 | 51–80 | 64 |

It can be readily seen from Tables 1 and 2 that the aluminum bearing waste from secondary aluminum processing is very complex. Therefore, it is much more difficult to recovery any aluminum, let alone substantially all, from such a source than it is to recover aluminum from the wastes of primary aluminum processing which have higher aluminum content and fewer chemical impurities.

A preliminary step for maximizing the effectiveness of the process of this invention is the pulverization of the waste particles. This may be accomplished by any method of pulverization known in the art, such as ball milling or wet grinding/attriting.

Following pulverization, the very large or "oversized" particles are ideally scalped from the waste. These oversize particles are very high in metallic content, usually in excess of 25 percent by weight aluminum. After mechanical separation, they can generally be sold as is or upgraded and sold for exothermic applications.

Alternatively, the large particles may be further pulverized and chemically treated with concentrated sodium or preferably ammonium hydroxides to reduce the aluminum alloys to a reactive state. The reactive particles are then added to the remainder of the waste for further processing.

Preferably they are treated by dry, high frequency, impact grinding. This is appropriately carried out by vibro-energy milling combined with air classification and/or mechanical screening for separation of the high aluminum content oversize.

The grinding time requirements are dependent upon the size and physical characteristics of the starting particles. Optimum separation was achieved within 3–6 minutes of either grinding in a batch dry vibro-energy milling operation or residence in a continuously fed and discharged dry vibro-energy mill.

During dry grinding, particularly high frequency impact grinding such as vibro-energy milling, there is a high degree of amalgamation of aluminum particles. As the waste is pulverized, the small, semi-malleable aluminum metal alloy particles are freed from the waste. They then tend to become hammered together into larger particles which are easily removed by mechanical separation.

Alternatively to dry grinding, the oversize particles may be wet ground. This can be performed in a high speed agitator, called an attritor, which subjects the waste to continuous interaction with a grinding media. This is followed by wet vibratory screening at successively finer screen sizes.

A number of lots of bag house dust, ranging in aluminum content from 6–15%, were attrited in this manner. After successive removal of +100, +200 and +325 mesh size particles, the batches were further attrited for several more minutes. Then the entire batch was rescreened as +325 mesh. As much as 1–2% of the residue collected on rescreening consisted of aluminum metal alloy particles, some of which were as large as +60 and +100 mesh. This data indicated that amalgamation was as great or greater with this method as with dry vibro-energy mill grinding.

In some respects, the attritor maximizes the amount of aluminum metal alloy particles removed; however, it has some disadvantages. The action of the water oxidizes the ultra-fine aluminum metal alloy particles resulting in a lower total metallic content in the oversize removed. Several tests indicated that 30–45% of the starting aluminum content is eliminated by 30–60 minutes of contact with water in the attriting operation.

Table 3 discloses the results of pulverizing the oversize of one lot of bag house dust by dry vibro-energy milling for six minutes in a 3 cubic foot commercial mill having ceramic cylinders as the grinding medium. The bag house dust used for this analysis had a powder bulk density of one g/cc. Rotap analysis revealed that 90% of it was −80 mesh. The lot contained 16.5% aluminum. The pulverized product was mechanically screened 80 mesh. The +80 mesh fraction was rescreened 80 mesh.

TABLE 3

| Reduction in Aluminum Particle Content After Dry Pulverization | | | |
|---|---|---|---|
| Size | % of Sample | Weight of Fraction | Weight % Al |
| Screen #1 | | | |
| +80 mesh | 24 | 8.5 lb. | 40.0 |
| −80 mesh | 76 | 27.0 lb. | 12.5 |
| Screen #2 | | | |
| +80 mesh | 67 | 5.7 lb. | 48.5 |
| −80 mesh | 33 | 2.8 lb. | 22.0 |

TABLE 4

| Reduction in Aluminum Particle Content After Wet Pulverization | | | | | |
|---|---|---|---|---|---|
| Lot # | 1 | 2 | 3 | 4 | 5 |
| Initial Aluminum % Content | 12.7 | 6.6 | 16.3 | 16.8 | 9.6 |
| Aluminum % after Wet Grinding | 9 | 3.6 | 9.9 | 10.2 | 6.8 |
| % of Aluminum Reduction | 29 | 45 | 39 | 39 | 29 |

Table 4 represents data on reduction of initial aluminum content of oversized particles by wet grinding five lots of bag house dust.

If the starting waste material is very fine, e.g., −80 mesh or less, the initial pulverization and scalping can be eliminated. If, however, it is not fine, there are several advantages in preliminary pulverization and scalping.

The presence of coarse aluminum metal alloy particles prevents maximum recovery of all the aluminum and the production of the alumina compounds which are the desired end products of this process. The particles, which have a hard crystalline surface, are not readily oxidizable in water alone. Very long reaction times at elevated water temperatures would be necessary to reduce the aluminum without initial pulverization. Even under these conditions and after high temperature calcining, some metallic particles would probably remain. Furthermore, the tendency of the particles to agglomerate before and during calcination would hinder the production of uniform particle size in the end product.

After initial pulverization and scalping, the carbides, nitrides and metallic particles previously entrained in the interior of the large particles are exposed to the expanded surface area available for reaction.

The pulverized waste is then introduced into a water tank having a volume approximately double that of the reactants. The extra volume requirement is necessitated by the highly exothermic reaction which results in intense boiling.

Since most aluminum bearing wastes contain a high percent of water soluble impurities, there is little advantage in using deionized water. Therefore, ordinary tap water suffices as the medium for the reaction.

After introduction of the waste into the water, the aluminum carbides rapidly dissociate to aluminum hydroxide and methane gas. The nitrides likewise dissociate to aluminum hydroxide and ammonia gas. These reactions are highly exothermic, therefore, requiring little or no supplemental heat to carry them to completion.

The heat of reaction is sufficient to promote the simultaneous endothermic reaction which converts aluminum metal and ammonium hydroxide to aluminum hydroxide and ammonia gas if the ammonium hydroxide concentration is low in proportion to the aluminum metal.

Once the aluminum bearing waste is introduced into the water, the resulting slurry must be kept under continuous agitation for a sufficient time to permit the reaction to go to completion or near completion.

If the reaction is initiated and carried out with little or no supplemental heat, then it is desirable to conserve the heat of reaction. This can be partially effectuated by establishing a high solids/water ratio. Additionally, the water tank should be insulated, covered and escape valves provided to prevent pressure build-up.

The reaction may also be initiated by heating the water between the range of 80° to 190° F., and preferably between 120°–140° F., then allowing the reaction to continue by virtue of its own heat.

Most preferably, the water during the dissociation/hydrolyzation/oxidation stage is maintained at approximately 180° F. At this temperature, the dissociation will quickly commence, raising the slurry temperature to 212° F. where intense boiling ensues. Boiling continues until equilibrium is established.

Improved rate of reaction and recovery of product results when external heat is applied to prevent the slurry from cooling below 180° F. An external burner or heat coil is preferable to an immersion heater because the latter tends to become insulated by a buildup of dehydrated slurry.

Obviously, it would be possible to carry out the reaction at higher temperatures if the system were pressurized. However, much of the energy conservation inherent in this process would then be lost.

Almost as soon as the slurry formed from wastes containing aluminum nitride begins to react, the generation of ammonium hydroxide will cause a pH reading of approximately 9.0. Upon completion of the reaction, the pH will range from approximately 10.5 to 11.0.

This dissociation/hydrolization/oxidation reaction may be completed within four to twelve hours, depending upon temperature and particle size or surface area available for reaction.

Table 5 shows the reduction in aluminum nitrides, carbides and related compounds in the waste composition following this initial pulverization and dissociation/hydrolization/oxidation reaction.

TABLE 5

| | Partial Composition of Waste Product | |
|---|---|---|
| Compound | Weight % Range Before Reaction[1] | Weight % Range After Reaction |
| Aluminum nitride | 11–32[2] | 0–2 |
| Aluminum carbides | 0–2 | undetectable |
| Related aluminum compounds | traces | undetectable |
| Aluminum alloys | 7–20 | 0–2 |
| Amorphous Phase | 24–49 | 60–70 |

[1]Mineralogical and chemical analysis based on eighteen lots of bag house dust generated at the same facility over a six month period.
[2]Separate chemical analysis showed additional aluminum nitride and varying percentages of $SiO_2$, MgO, Al, $Al_2O_3$ and/or $MgO.Al_2O_3$ in the amorphous phase.

Although initial pulverization and reaction with water results in an intermediate product relativity free of aluminum nitrides, carbides and other alloys, it has been found that multiple or continuous pulverization during the reaction substantially improves the purity of product and the complete conversion of all the aluminum to alumina.

At any stage during the reaction, aluminum particles remaining in the slurry may be screened out and dried for use as an exothermic product. However, they may be further attrited and returned to the slurry for reaction to alumina or alumina compounds.

Pulverization during the dissocation/hydrolization/oxidation process can be accomplished by the same or a different method as used during initial pulverization. For example, after the slurry is heated to approximately 180° F., it may be removed to a circulation attritor charged with steel or ceramic balls. It is then attrited for a sufficient time to reduce all particles to predominantly sub-micron sizes.

Any type of grinding unit would suffice for this stage of the process as long as it is capable of meeting the particle size requirement. For example, a ceramic lined wet vibro-energy mill would also suffice.

The slurry is then discharged from the attritor into an agitated heated tank and maintained at the elevated temperatures for dissociation/hydrolization/oxidation until there is no measurable trace of aluminum metal or aluminum nitrides. The presence of these substances can be determined by various chemical methods, x-ray of the dried slurry or by testing for emission of ammonia gas.

Upon completion of the reaction, the slurry is diluted with water to reduce the concentration of the sodium and potassium ions. Dilution must be great enough so that after drying and dehydrating the sum of the residual sodium and potassium oxides will remain typically below 0.5%.

Sodium and potassium removal can be accelerated after dilution by adding flocculants to the slurry. Flocculation speeds settling of the particulate and allows removal of the clear solution having dilute concentrations of sodium, potassium and chlorine ions. Obviously, only those flocculants which will not retain sodium, potassium and chlorine ions should be utilized.

The product is then preferably decanted. The decantation step may be eliminated when the heated slurry is fed directly to a vacuum belt filter in order to reduce the energy input into the system and to conserve fuel. Sodium and potassium oxide levels are reduced because more water is eliminated in vacuum filtration.

Final filtering and washing of the slurry may be accomplished on a continuous vacuum belt filter. Such equipment permits reduction of moisture content to approximately 30%. If in the same operation, the filter cake is rinsed, this effectively removes additional sodium, potassium, and chloride ions. Alternatively, a filter press may be used to de-water the slurry rather than the continuous belt filter.

The product produced by this process can be further converted to a finished ceramic grade product by drying, dehydrating and calcining the intermediate product. Several lots of it were dried at approximately 212° F., pulverized and pressed into simple ceramic discs, using standard laboratory pressing equipment and dies. When fired at normal alumina ceramic firing cycles, the discs were free of structural defects.

Ideally, the product from the previously discussed steps may be used as an intermediate for further processing to recover a variety of end products. This can be accomplished by the procedures specified herein.

The first step towards converting the intermediate product to commercial alumina and other alumina compounds requires drying and dehydration of the wet intermediate product.

Drying requires removal of physically combined water retained after filtration. It can be accomplished at temperatures of 100° C. or less.

Dehydration requires removal of chemically combined water originally present in the starting material and intermediate product as hydroxides.

Complete dehydration requires a minimum temperature of 400° C. or above as indicated by the following reactions:

Drying/dehydration may be accomplished utilizing furnace temperatures in excess of 1100° C. so that the product temperature probably is in excess of 700°–800° C. or higher. Under such conditions, there have been no deleterious effects on the final products.

Dehydration may be accomplished by a variety of known methods such as high intensity gas infrared heating of the intermediate product on a woven mesh belt; turbo drying/dehydration; auger drying/dehydration, etc.

The drying/dehydration step(s) permits formation of a uniform feed for mechanical processing which is completely dehydrated and not sintered.

Elimination of the dehydration step results in several deleterious effects on particle density and size distribution in the finished product. If such uniformity of particle size and density is not required in a specific product, then this step can be eliminated.

The single most important step for producing commercial alumina and high purity alumina compounds is the calcining of the intermediate product. Preparatory to calcining, the dried and dehydrated intermediate product is mechanically processed to obtain calcining furnace feed of the desired particle size, distribution and density without the necessity of further grinding. These variables stem from the product specifications.

The preferred mechanical processing of calcining furnace feed for obtaining particle density is dry ball milling followed by continuous liquid/solids granulation and drying.

An alternative to dry ball milling and liquid/solids granulation is dry ball milling the dried and dehydrated filter cake. Dry milling cycles of 15 to 30 minutes in a 2 ft.×3 ft. dry ball mill using either steel or alumina balls has been found to be satisfactory for these purposes. The time will vary depending upon the density, particle size and distribution requirements.

It is also possible to use batch or continuous liquid/solid granulation without the use of prior dry ball milling. This is an economical method for producing alumina of a larger size; for example, having a high percentage of −20 to +40 mesh. Elimination of the dry ball milling generally results in lower particle density and lower powder bulk density for granulation.

Densification in granulation before calcining can also be accomplished by other commercially available techniques including disc pelletization, drum pelletization, etc. Choice of method is dependent upon size and distribution of particles desired after calcining.

If the calcined feed is pelletized to large pellets or granules, they will retain a high percentage of their original particle characteristics in subsequent calcination.

Attriting the calcining furnace feed to produce a "fluffy" product which is then calcined on a very fast cycle at low temperature results in an alumina product having a very high surface area. Such a product would, for example, be suitable as a filter aid.

The mechanically processed feed may be calcined in a variety of furnace types, such as vibratory, rotary kiln, "thin bed" loaded roller hearths or pusher slab kilns. The primary objective of calcining is to produce alumina in the crystalline phase for use in ceramic or refractory operations so that virtually all of the aluminum present in starting waste is converted to commercially useful end products.

The time and temperature parameters depend on the desired end product. Low temperatures, e.g., 1700°–2000° F., preferably, 1900°–2000° F., and fast cycles, e.g., 10–20 seconds, are desirable for high surface area products. Such products are also most economically calcined by vibratory calcination.

Although short periods of calcining, measured in seconds, are sufficient to develop crystallinity, longer periods, measured in minutes or hours, are necessary to develop complete crystallinity.

Higher temperatures on the order of 2600°–2800° F. and cycles of 30–60 seconds or longer are the most desirable for fine particle size/high density alumina.

Coarse grained alumina products, e.g., ¼ inch, +20 mesh and +100 mesh, require 1–10 minute cycles and temperatures between 2600°–2800° F.

If dehydration was not done in a simultaneous operation with drying of the intermediate product prior to or during mechanical processing, it can be carried out during calcining.

Tables 6 and 7 illustrate the relationship between the percentage of aluminum in the intermediate product and the agglomeration of particles during calcination.

The data in Table 6 is based upon three lots of bag house dust which were identically treated. The intermediate product was simultaneously dried and dehydrated, attrited, then vibratory calcined at 2700° F.

TABLE 6

Relationship Between Aluminum Content & Agglomeration of Particles During Calcination

| Lot # | By Weight, % Al of Intermediate | Calcined Alumina Particle Size By Weight | | | |
|---|---|---|---|---|---|
| | | % +200 Mesh | % Al | % −200 Mesh | % Al |
| 5 | 7.5 | 97 | 5[1] | 3 | 1 |
| 13 | 2.05 | 46 | 1.6 | 57 | 1 |
| 9 | 1.2 | 39 | 1.1 | 61 | 0.7 |

[1] 80% of this was very coarse, e.g., +40 mesh. Only 10.2% of Lots 9 and 13 were in the +40 mesh size range.

Table 7 is based upon two lots of baghouse dust used to produce high surface area commercial alumina on a pilot plant scale. The intermediate product was dried, then simultaneously dehydrated and calcined in a vibratory calciner at 1700° F.

TABLE 7

Relationship Between Aluminum Content & Agglomeration of Particles During Calcination

| Lot # | By Weight, % Al of Intermediate | Calcined Alumina Particle Size By Weight | | | |
|---|---|---|---|---|---|
| | | % +325 Mesh | % Al | % −325 Mesh | % Al |
| P-1 | 1.4 | 9 | 5.6 | 91 | 0.8 |
| P-2 | 0.8 | 2 | 0.8 | 98 | 0.8 |

When calcining is carried out on a vibratory hearth, the calcining feed is deposited uniformly over the width of the refractory hearth. The hearth is slightly inclined and oscillated. The feed gently tumbles forward on the surface of the hearth, absorbing heat from both the refractory hearth and an overhead burner source.

It is essential that the vibration be gentle in order to retain the particle size and reduce the danger of particle fracture and dusting. Average particle size will be reduced slightly in direct proportion to the amount of sintering or shrinkage taking place. The amount of shrinkage will be determined by the temperature and length of calcining time.

An alternative to the refractory hearth method of calcination would be to use a rotary kiln. The disadvantage of the rotary kiln is that it results in greater degradation of the calcining feed and a higher percentage of fine particle dust. Additionally, fuel costs are increased by the use of a rotary kiln.

Depending upon the content of the starting material, additional alumina compounds can also be produced by this method. For example, magnesium aluminum oxide can be produced if magnesium is present in the waste or by adding small quantities of magnesium carbonate or fine particle size magnesium oxide to the slurry after preparation of the highly reactive intermediate product. The product is treated as in the above process resulting in almost 100% magnesium aluminum oxide.

Table 8 illustrates the weight percentage range of the various compounds in the calcined products derived from fourteen lots of bag house dust which contained quantities of magnesium.

TABLE 8

| Composition of Calcined Product | |
|---|---|
| Compound | Range of Weight % in 14 Batches |
| $\alpha Al_2O_3$ | 25–75 |
| $MgO.Al_2O_3$ | 20–59 |
| $CaO.6Al_2O_3$ | 0–8 |
| $Na_2O.Al_2O_3.4SiO_2$ | 0–2 |
| $Na/KO.Al_2O_3.6SiO_2$ | 0–2 |

What is claimed is:

1. A process for the conversion of substantially all aluminum present in an aluminum bearing secondary waste source to anhydrous alumina and compounds of alumina comprising the following steps:
    (a) pulverizing the waste;
    (b) scalping oversized aluminum bearing particles from the pulverized waste;
    (c) subjecting the oversized particles to further pulverizing;
    (d) combining the pulverized waste from steps (a), and (c), and placing the mixture in water heated to the range of 120°–180° F., thereby forming a slurry;
    (e) agitating the slurry;
    (f) continuously pulverizing the particles remaining in the slurry to maximize their reactive surface area;
    (g) continuing pulverization and agitation until the carbides, nitrides, and aluminum alloys are dissociated, the resulting aluminum ions are hydrolized and oxidized and all particles are reduced to predominantly sub-micron sizes;
    (h) diluting, decanting and filtering the reacted product to obtain an intermediate product;
    (i) mechanically processing, drying and dehydrating the intermediate product; and
    (j) calcining to a finished product.

2. A process according to claim 1 in which the aluminum bearing secondary waste is bag house dust.

3. A process according to claim 1 in which the pulverizing steps are accomplished by dry, high frequency, impact grinding.

4. A process according to claim 3 in which the particles are pulverized for 3 to 6 minutes.

5. A process according to claim 1 in which the pulverizing steps are accomplished by wet-grinding.

6. A process according to claim 5 in which the wet-grinding is performed in an attritor capable of reducing particles to sub-micron sizes.

7. A process according to claim 1 in which the mechanical processing of the intermediate product is by dry ball milling.

8. A process according to claim 1 in which the mechanical processing of the intermediate product is by liquid-solids granulation.

9. A process according to claim 1 in which the mechanical processing of the intermediate product is by disc pelletization.

10. A process according to claim 1 in which the intermediate product is first mechanically processed followed by the steps of drying and dehydrating prior to calcining.

11. A process according to claim 1 in which the intermediate product is first dried, then mechanically processed and dehydrated prior to calcining.

12. A process according to claim 1 in which the drying and mechanically processing steps are followed by simultaneously dehydrating and calcining.

13. A process according to claim 1 in which the calcining step is carried out at a temperature between 1900° and 2800° F. for a period of 10 seconds to 10 minutes.

14. A process according to claim 13 in which calcining is conducted at a temperature of 1900°–2000° F.

15. A process according to claim 13 in which calcining is conducted at a temperature of 2600°–2800° F.

16. A process according to claim 13 in which calcining is conducted for 10–20 seconds.

17. A process according to claim 13 in which calcining is conducted for 30–60 seconds.

18. A process according to claim 13 in which calcining is conducted for 1–10 minutes.

19. A process according to claim 1 in which the aluminum bearing secondary waste source is bag house dust and the anhydrous alumina is ceramic grade comprising the following steps:
 (a) pulverizing the dust by dry, high frequency, impact grinding for 3 to 6 minutes;
 (b) scalping oversized aluminum bearing particles from the pulverized dust;
 (c) subjecting the oversized particles to further pulverizing;
 (d) combining the pulverized particles from steps (a) and (c) and placing the mixture in water heated to approximately 140°–180° F., thereby forming a slurry;
 (e) agitating the slurry;
 (f) continuously pulverizing the particles remaining in the slurry to maximize their reactive surface area;
 (g) continuing pulverization and agitation until the carbides, nitrides, and aluminum alloys are dissociated, the resulting aluminum ions are hydrolized and oxidized and all particles are reduced to predominantly sub-micron sizes;
 (h) diluting, decanting and filtering the reacted product to obtain an intermediate product;
 (i) drying and dehydrating the intermediate product;
 (j) mechanically processing the intermediate product by dry ball milling followed by liquid-solids granulation;
 (k) calcining the intermediate product for 20 to 90 seconds at 2600°–2800° F.

20. A process according to claim 1 in which the aluminum bearing secondary waste source is bag house dust containing between 2.0–35.0 weight percentage magnesium aluminum oxide and additional magnesium oxide and the compound of aluminum formed is magnesium aluminum oxide comprising:
 (a) pulverizing the dust by dry, high frequency, impact grinding for 3 to 6 minutes;
 (b) scalping oversized aluminum bearing particles from the pulverized dust;
 (c) subjecting the oversized particles to further pulverizing;
 (d) combining the pulverized particles from steps (a) and (c) and placing the mixture in water heated to approximately 120°–180° F., thereby forming a slurry;
 (e) agitating the slurry;
 (f) continuously pulverizing the particles remaining in the slurry to maximize their reactive surface area;
 (g) continuing pulverization and agitation until the carbides, nitrides, and aluminum alloys are dissociated, the resulting aluminum ions are hydrolized and oxidized and all particles are reduced to predominantly sub-micron sizes;
 (h) diluting, decanting and filtering the reacted product to obtain an intermediate product;
 (i) drying and dehydrating the intermediate product;
 (j) mechanically processing the intermediate product by dry ball milling followed by liquid-solids granulation;
 (k) calcining the intermediate product.

21. A process according to claim 20 in which the water in step (d) is heated to 140°–180° F.

22. A process according to claim 20 or claim 21 in which the intermediate product is calcined according to step (k) at 2300° F. for at least 120 seconds.

23. A process according to claim 20 or 21 in which the intermediate product is calcined according to step (k) at 2400° F. for at least 60 seconds.

24. A process according to claim 20 or 21 in which the intermediate product is calcined according to step (k) at 2500° F. for at least 20 seconds.

* * * * *

UNITED STATES PATENT AND TRADEMARK OFFICE
CERTIFICATE OF CORRECTION

PATENT NO. : 4,348,366
DATED : September 7, 1982
INVENTOR(S) : Raymond J. Brown, et al.

It is certified that error appears in the above—identified patent and that said Letters Patent is hereby corrected as shown below:

On the cover page of the patent insert:

--Assignee: Alumax, Inc.

Signed and Sealed this

Twenty-ninth Day of March 1983

[SEAL]

Attest:

Attesting Officer

GERALD J. MOSSINGHOFF

Commissioner of Patents and Trademarks